United States Patent Office 2,877,141
Patented Mar. 10, 1959

2,877,141

ADHESIVE COATED PLASTIC MATERIAL

Thomas H. Shelley, Jr., Milltown, and Richard N. Zirnite, New Brunswick, N. J., assignors to Johnson & Johnson, a corporation of New Jersey No Drawing. Application October 27, 1955
Serial No. 543,258

20 Claims. (Cl. 117—122)

This invention relates to an adhesive material comprising a plasticized film backing and a normally tacky and pressure-sensitive adhesive mass, wherein the film backing contains about 5 to 40 percent of a migratory plasticizer based on the weight of the film, and the adhesive mass contains an amount of migratory plasticizer which is substantially in equilibrium with the amount of migratory plasticizer in the backing, which adhesive material is stabilized or substantially free from lateral exudation of the adhesive mass relative to the backing.

Adhesive plastic tapes, bandages, and the like are well-known and have achieved considerable commercial success. These materials may be prepared from a plasticized film backing and a normally tacky and pressure-sensitive adhesive mass by known methods. Preferably, such adhesive materials are prepared from backings containing a migratory type plasticizer, especially where soft and flexible materials are desired. However, adhesive material prepared from backings containing substantial amounts of such plasticizers tend toward excessive or undesirable lateral exudation of the adhesive mass, relative to the backing, upon long standing at ordinary temperatures or more rapidly when subjected to chemical sterile conditions (e. g. to a mixture of about 10 percent ethylene oxide and 90 percent carbon dioxide, together with a small amount of moisture) under elevated temperatures.

The art is confronted by the problem of providing such adhesive materials containing plasticized film backings which include a migratory plasticizer, which materials are free from undesirable exudation.

The discoveries associated with the invention and relating to solution of the above problem, and the objects achieved in accordance with the invention as set forth herein include: the provision of a stabilized adhesive material comprising a plasticized film backing including a migratory plasticizer and a normally tacky and pressure-sensitive adhesive mass, which adhesive mass contains an amount in the range of about 0.05 to 0.5 part by weight of migratory plasticizer per part of such plasticizer in the backing, the amount of migratory plasticizer in the mass being substantially in equilibrium with the amount of migratory plasticizer in the backing, which adhesive material is substantially free from lateral exudation of the adhesive mass relative to the backing; and other objects which will be apparent as details or embodiments of the invention as set forth hereinafter.

In order to facilitate a clear understanding of the invention, the following preferred specific embodiments are described in detail.

*Example I*

An adhesive mass is applied to a film backing in conventional manner, e. g. by spreading, the film having a thickness in the same range (e. g. about 1 to 5 ounces of adhesive mass per sq. yard of backing). The backing may be of commercial polyvinyl chloride resin containing about 5 to 40 percent of a migratory plasticizer such as tricresyl phosphate based on the weight of the backing and optionally may also contain a permanent or non-migratory plasticizer such as polyglycol adipate or the like, in the amount in the range of about 15 to 25 percent of the backing stabilizer, such as a relatively low molecular weight polyvinyl material produced by reacting a polyphenolic compound with epichlorohydrin in an amount in the range of about 1 to 5 percent of the backing, and pigments or coloring materials such as titanium oxide, red iron oxide, yellow iron oxide, carbon black or the like in a total amount in the range of about 0 to 15 percent of the backing. Preferably, a conventional primer is applied to the film backing prior to applying the adhesive mass; e. g., a mixture of 50 percent aqueous polyisobutylene emulsion (5 parts by weight solids) and a copolymer of acrylonitrile with butadiene (1 part).

The adhesive mass may be based on natural pale crepe rubber blended with polyisobutylene (molecular weight $1.2 \times 10^6$ by Staudinger method with cyclohexane solvent at 30° C.) in an amount in the range of about 30 to 70 percent based on the weight of the rubber, factice (sulphur vulcanized unsaturated vegetable oil) in a small amount, low molecular weight polyisobutylene liquid in a small amount, polyterpene resin in the amount in a range of about 100 to 200 percent of the elastomers, and titanium oxide in a small amount, zinc dioxide in an amount in the range of about 40 to 80 percent of the rubber, and lanolin in an amount in the range of about 5 to 20 percent of the rubber.

The adhesive mass contains 0.05 to 0.50 part by weight of tricresyl phosphate per part thereof in the backing. The resulting film may be prepared in roll form as plastic tape or in the form of plastic strips (i. e. adhesive bandages), by applying to a portion thereof a gauze pad, and if desired protective or facing member may be applied to the adhesive mass to protect it until ready for use. The resulting film is chemically sterilized at 100 to 200° F. for one to five hours in known manner, and the sterilized material is substantially free from lateral exudation of the adhesive mass relative to the backing (for a film of about ¾" width, the exudation of "finning" per side is not over 0.1 mm.).

In a comparative test, a similar adhesive material was prepared, except that no tricresyl phosphate was included in the adhesive mass; and the resulting sterilized material showed a lateral exudation of the adhesive mass of about 0.5 mm. or more, which is regarded as clearly unsatisfactory.

It is evident from the foregoing results that the material prepared in accordance with the invention shows at least about 5 fold improvement over that of the comparison test, as to the freedom from lateral exudation feature.

*Example II*

Following the above procedure, except substituting for the tricresyl phosphate in both the film backing and in the adhesive mass a similar weight of di-2-ethylhexyl phthalate for a film of about 1 inch width, the exudation per side is 0.4 to 0.5 mm.; whereas for a comparative material with no di-2-ethylhexyl phthalate in the adhesive mass, the exudation is 0.8 to 1.0 mm. This is an about 2 fold difference.

*Example III*

Following the above procedure, except substituting for the tricresyl phosphate in both the film backing and in the adhesive mass a similar weight of methyl acetyl ricinoleate for a film of about 1 inch width, the exudation per side is 0.4 to 0.5 mm.; whereas for a comparative material with no methyl acetyl ricinoleate in the adhesive mass, the exudation is 0.8 to 0.9. This is an about 2 fold difference.

*Example IV*

The above procedure is repeated except using the film backing of Example I with the adhesive mass of Example II; and in an Example II type test the exudation is 0.2 to 0.3 mm., whereas the comparative run is about 0.5 mm. This is an about 2 fold difference, even though the plasticizer in the mass is a different chemical than that in the film backing.

Comparable results to the foregoing may be achieved with various modifications thereof such as the following: the plasticizer may be alkyl phthalates, alkyl adipates, and the like, wherein the alkyl group contains 4 to 10 carbon atoms; also alkyl acetyl ricinoleate, wherein the alkyl group contains 1 to 10 carbon atoms. The film backing may be of polyvinyl chloride, a copolymer of polyvinyl chloride and polyvinyl acetate, a copolymer of polyvinyl chloride and vinylidene chloride, a copolymer of polyvinyl chloride and acrylonitrile, and the like self-supporting film materials. The adhesive mass may be made up from a rubbery elastomer such as pale crepe rubber or solid polyisobutylene or polyvinyl ether, or a copolymer of styrene and butadiene. This mass should also contain a tackifying resin, such as natural rosin, rosin acid esters (with mono or polyhydric alcohols), or similar materials, wherein the rosin group is modified by hydrogenation or a disproportionation, polyturpene resins (such as poly-beta-pinene), and the like. It may contain inorganic or organic fillers such as zinc oxide, titanium oxide, aluminum oxide (hydrate), calcium carbonate, starch and the like materials finely divided or powder form. It may contain other organic ingredients such as mineral oil, lanolin, liquid polyisobutylene factice, or the like. If desired, the mass may also contain a usual anti-oxidant (e. g. alkylated diphenyl amine).

In view of the foregoing disclosures, variations or modifications thereof will be apparent, and it is intended to include within the invention all such variations and modifications except as do not come within the scope of the appended claims.

We claim:

1. A stabilized adhesive material comprising a plasticized film backing containing at least 5% by weight of migratory plasticizer and a normally tacky and pressure-sensitive adhesive mass, said mass containing an amount in the range of about 0.05 to 0.5 part by weight of migratory plasticizer per part of such plasticizer in said backing which amount of said plasticizer in said mass is substantially in equilibrium with the amount of such plasticizer in said backing, whereby the pressure-sensitive adhesive mass is prevented from exuding laterally when the adhesive surface is covered.

2. A material of claim 1 wherein the backing is a vinyl plastic plasticized with aryl phosphate migratory plasticizer.

3. A material of claim 2 wherein the migratory plasticizer is tricresyl phosphate.

4. A material of claim 3 wherein the backing is polyvinyl chloride containing about 10 to 80% of the plasticizer based on the weight of the polyvinyl chloride, and the adhesive mass contains from 0.05 to 0.5 part of weight of tricresyl phosphate per part of said tricresyl phosphate in said backing.

5. A material of claim 1 wherein the backing is a vinyl plastic plasticized with alkyl phthalate migratory plasticizer.

6. A material of claim 5 wherein the migratory plasticizer is di-2-ethylhexyl phthalate.

7. A material of claim 1 wherein the backing is a vinyl plastic plasticized with alkyl adipate migratory plasticizer.

8. A material of claim 7 wherein the migratory plasticizer is di-n-octyl adipate.

9. A material of claim 1 wherein the backing is a vinyl plastic plasticized with alkyl acetyl ricinoleate migratory plasticizer.

10. A material of claim 9 wherein the migratory plasticizer is methyl acetyl ricinoleate.

11. A method of preparing a stabilized adhesive material, which comprises applying a normally tacky and pressure-sensitive adhesive mass to a plasticized adhesive film backing containing at least 5% by weight of migratory plasticizer, said mass containing an amount in the range of about 0.05 to 0.5 part of migratory plasticizer per part of such plasticizer in said backing which amount of said plasticizer in said mass is substantially in equilibrium with the amount of such plasticizer in said backing, said adhesive material being substantially free from lateral exudation of said mass relative to said backing.

12. A method of claim 11 wherein the backing is a vinyl plastic plasticized with aryl phosphate migratory plasticizer.

13. A method of claim 12 wherein the migratory plasticizer is tricresyl phosphate.

14. A method of claim 11 wherein the backing is a vinyl plastic plasticized with alkyl phthalate migratory plasticizer.

15. A method of claim 14 wherein the migratory plasticizer is ethylhexyl phthalate.

16. A method of claim 11 wherein the backing is a vinyl plastic plasticized with alkyl adipate migratory plasticizer.

17. A method of claim 16 wherein the migratory plasticizer is di-n-octyl adipate.

18. A method of claim 11 wherein the backing is a vinyl plastic plasticized with alkyl acetyl ricinoleate migratory plasticizer.

19. A method of claim 18 wherein the migratory plasticizer is methyl acetyl ricinoleate.

20. A method of claim 12 wherein the backing is polyvinyl chloride containing about 10 to 80% of the plasticizer based on the weight of the polyvinyl chloride, and the adhesive mass contains from 0.05 to 0.5 part of weight of tricresyl phosphate per part of said tricresyl phosphate in said backing.

References Cited in the file of this patent

UNITED STATES PATENTS

| | | |
|---|---|---|
| Re. 23,843 | Oace | June 29, 1954 |
| 2,332,265 | Schmidt | Oct. 18, 1943 |
| 2,364,875 | Schieman | Dec. 12, 1944 |
| 2,554,791 | Nickerson | May 29, 1951 |
| 2,599,576 | Morris | June 10, 1952 |
| 2,648,614 | Martin | Aug. 11, 1953 |
| 2,734,503 | Doyle | Feb. 14, 1956 |